(12) United States Patent
Chen et al.

(10) Patent No.: US 7,026,074 B2
(45) Date of Patent: Apr. 11, 2006

(54) LITHIUM ION BATTERY WITH IMPROVED SAFETY

(75) Inventors: Chun-hua Chen, Westmont, IL (US); Yoo Eup Hyung, Lisle, IL (US); Donald R. Vissers, Naperville, IL (US); Khalil Amine, Downers Grove, IL (US)

(73) Assignee: The University of Chicago, Chicago, IL (US)

( * ) Notice: Subject to any disclaimer, the term of this patent is extended or adjusted under 35 U.S.C. 154(b) by 419 days.

(21) Appl. No.: 10/077,569

(22) Filed: Feb. 15, 2002

(65) Prior Publication Data
US 2003/0157413 A1 Aug. 21, 2003

(51) Int. Cl.
H01M 10/40 (2006.01)

(52) U.S. Cl. .................. 429/326; 429/328; 429/329

(58) Field of Classification Search ............... 429/331, 429/335, 176, 231.9, 231.95, 326, 328, 329, 429/330, 332
See application file for complete search history.

(56) References Cited

U.S. PATENT DOCUMENTS 5,455,127 A * 10/1995 Olsen et al. ............... 429/306
6,068,950 A * 5/2000 Gan et al. ................ 429/231.9
6,506,524 B1 * 1/2003 McMillan et al. .......... 429/324
2002/0164531 A1* 11/2002 Sekino et al. .............. 429/331

FOREIGN PATENT DOCUMENTS

JP 358214281 * 12/1983
JP 2001006729 * 1/2001

* cited by examiner

Primary Examiner—Michael Barr
Assistant Examiner—Monique Wills
(74) Attorney, Agent, or Firm—Emrich & Dithmar LLC

(57) ABSTRACT

A lithium battery with improved safety that utilizes one or more additives in the battery electrolyte solution wherein a lithium salt is dissolved in an organic solvent, which may contain propylene, carbonate. For example, a blend of 2 wt % triphenyl phosphate (TPP), 1 wt % diphenyl monobutyl phosphate (DMP) and 2 wt % vinyl ethylene carbonate additives has been found to significantly enhance the safety and performance of Li-ion batteries using a $LiPF_6$ salt in EC/DEC electrolyte solvent. The invention relates to both the use of individual additives and to blends of additives such as that shown in the above example at concentrations of 1 to 4-wt % in the lithium battery electrolyte. This invention relates to additives that suppress gas evolution in the cell, passivate graphite electrode and protect it from exfoliating in the presence of propylene carbonate solvents in the electrolyte, and retard flames in the lithium batteries.

32 Claims, 8 Drawing Sheets

Cyclic performance of lithium ion cell with 5 wt% VEC (curve A), with 5 wt% TPP (curve B) and with 2 wt% VEC + 2 wt% TPP + 1 wt% DMP mixture (curve C) flame retardant.

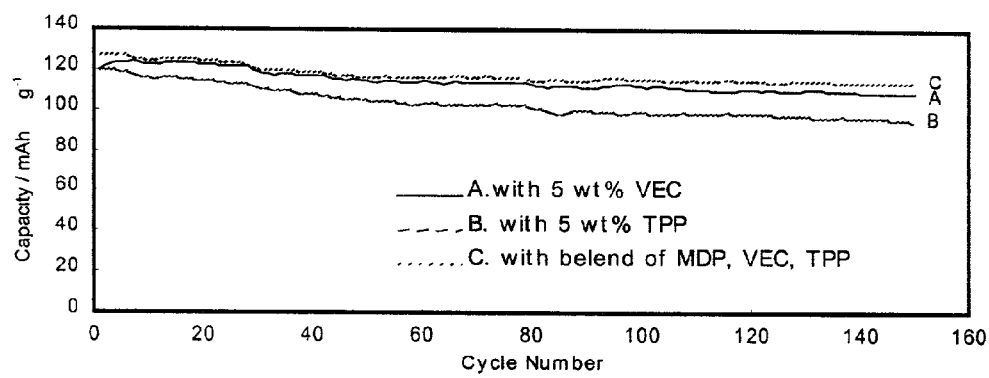
Fig.1 Cyclic performance of lithium ion cell with 5 wt% VEC (curve A), with 5 wt% TPP (curve B) and with 2 wt% VEC + 2 wt% TPP + 1 wt% DMP mixture (curve C) flame retardant.

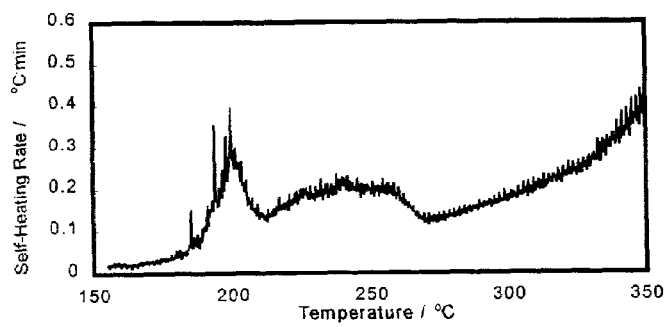
(A) with 5 wt% VEC
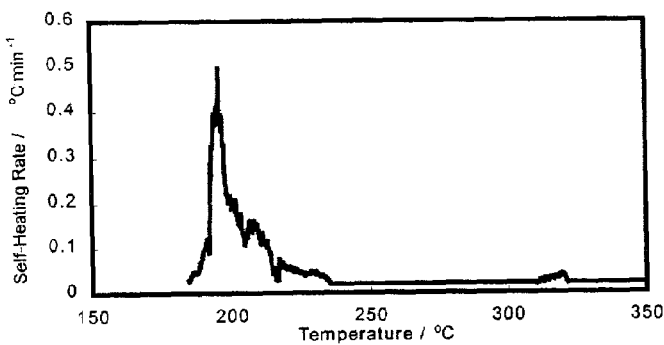
(B) with 5 wt% TPP
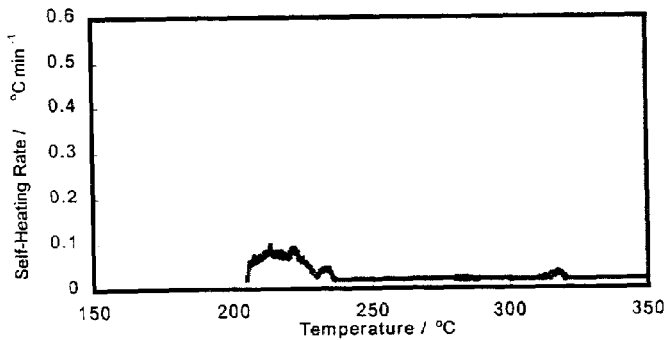
(C) with mixture of 2 wt% VEC, 2 wt% TPP, and 1 wt% MDP
Fig.2. Self Heat rate from ARC experiment of the reaction between fully charged graphite anode and LiPF$_6$/EC/DEC electrolyte with 5 wt% VEC (Fig.2A), with 5 wt% TPP (Fig.2B) and with 2 wt% VEC + 2 wt% TPP + 1 wt% DMP mixture (Fig.2C) flame retardant.

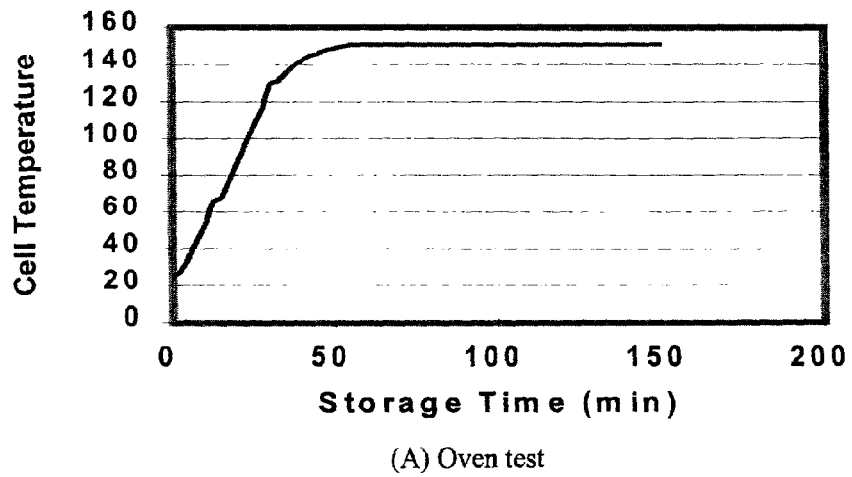
(A) Oven test
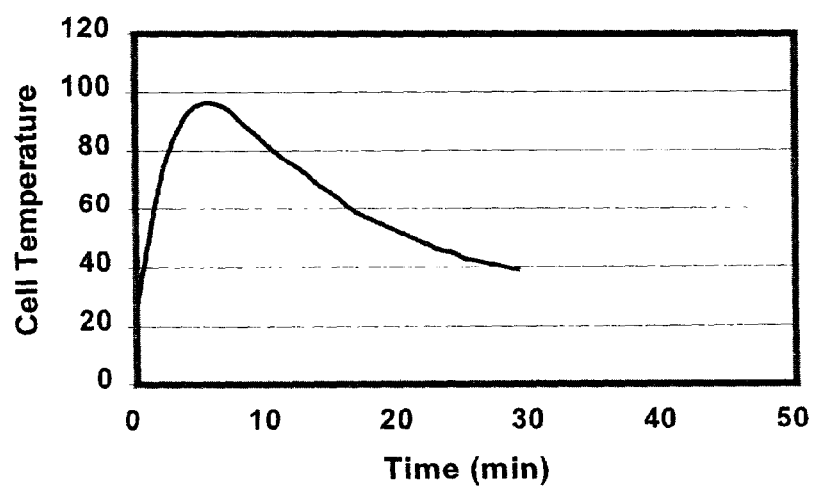
(B) Nail penetration test
Fig.3. Oven test (Fig.3A) and nail penetration test (Fig.3B) of 180 mAh prismatic cells containing mixture of 2 wt% VEC, 2 wt% TPP, and 1 wt% MDP as flame retardant.

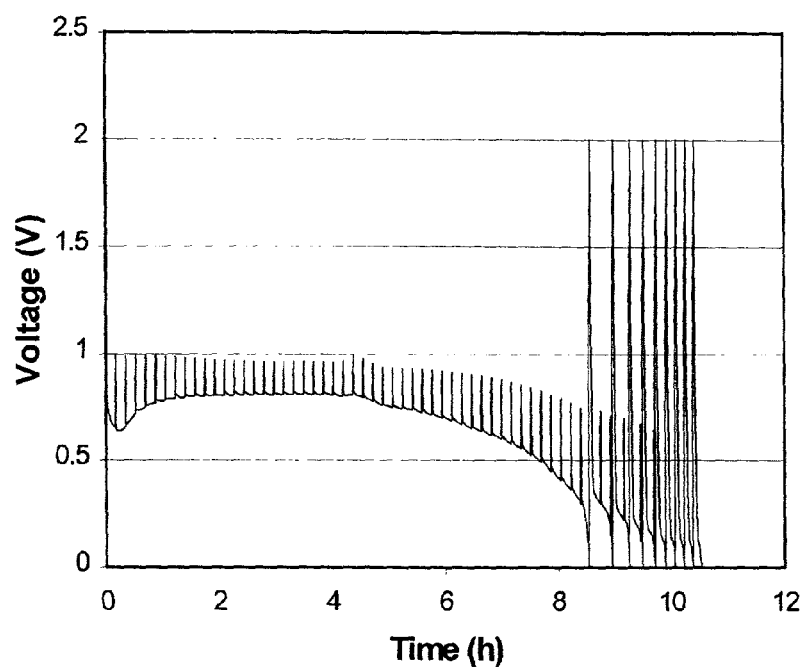
Fig.4 A charge & discharge curve of half cell: NG (a crystalline natural graphite)/Li with 1.2MLiPF$_6$ in 2EC7PCMEC electrolyte (no additive). The current density is 0.625 mA/cm$^2$

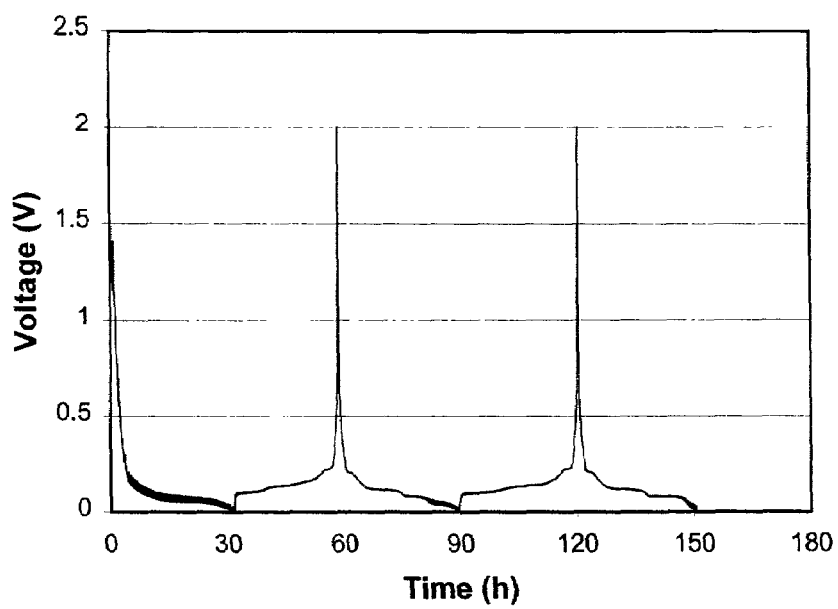
Fig.5 A charge & discharge curve of half cell: NG ( a crystalline natural graphite)/Li with 1.2MLiPF$_6$ in 2EC7PCMEC electrolyte (with 2wt% 4,5-diphenyl-1,3-dioxol-2-one additive). The current density is 0.625 mA/cm$^2$

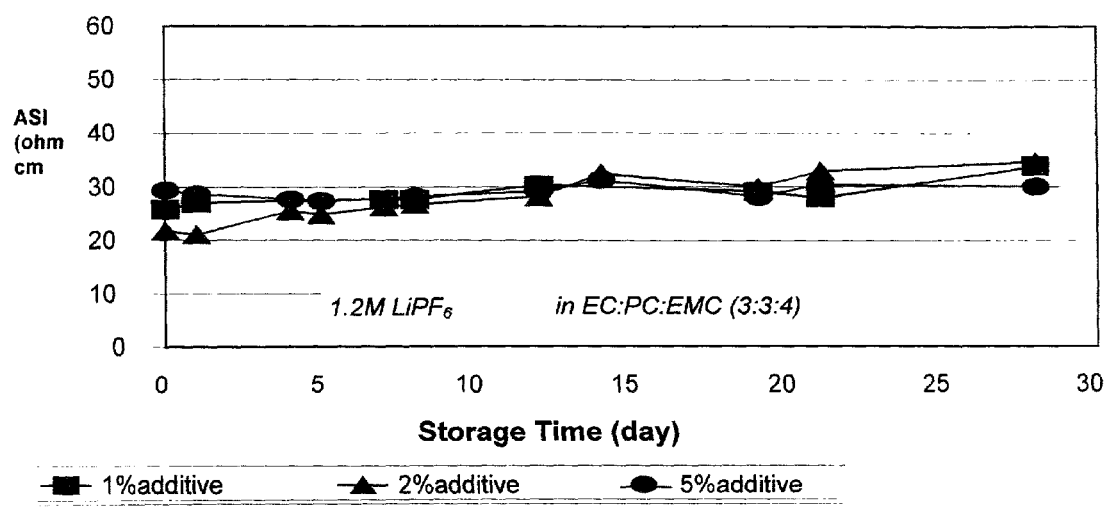
Fig. 6 Area Specific Impedance (ASI) change during 50°C storage of half-cell: NG ( a crystalline natural graphite)/Li with 1.2M LiPF$_6$ in 2EC:&PC:1MEC electrolyte ( with 1wt%, 2wt% and 5wt% of 4,5-diphenyl-1,3-dioxol-2-one additive)

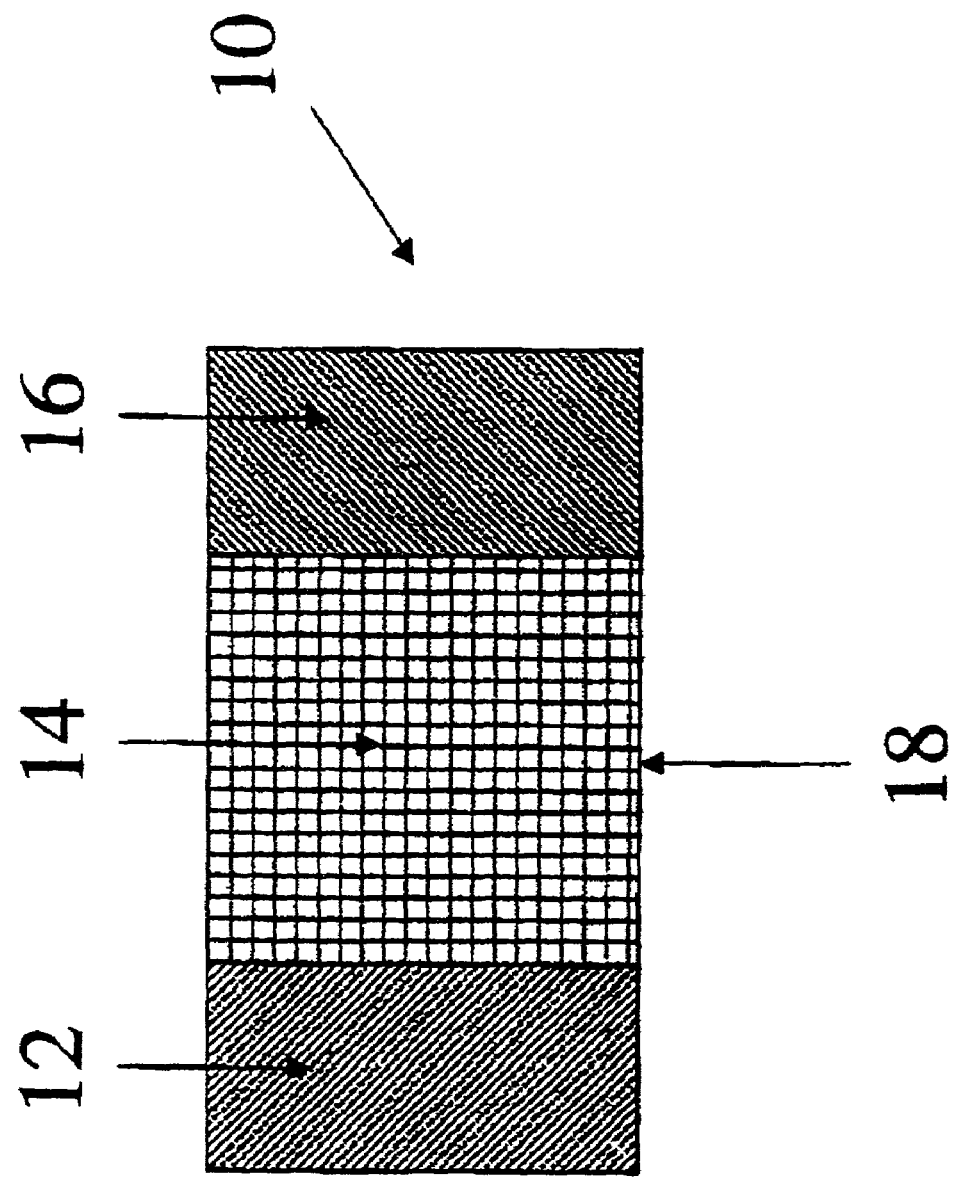

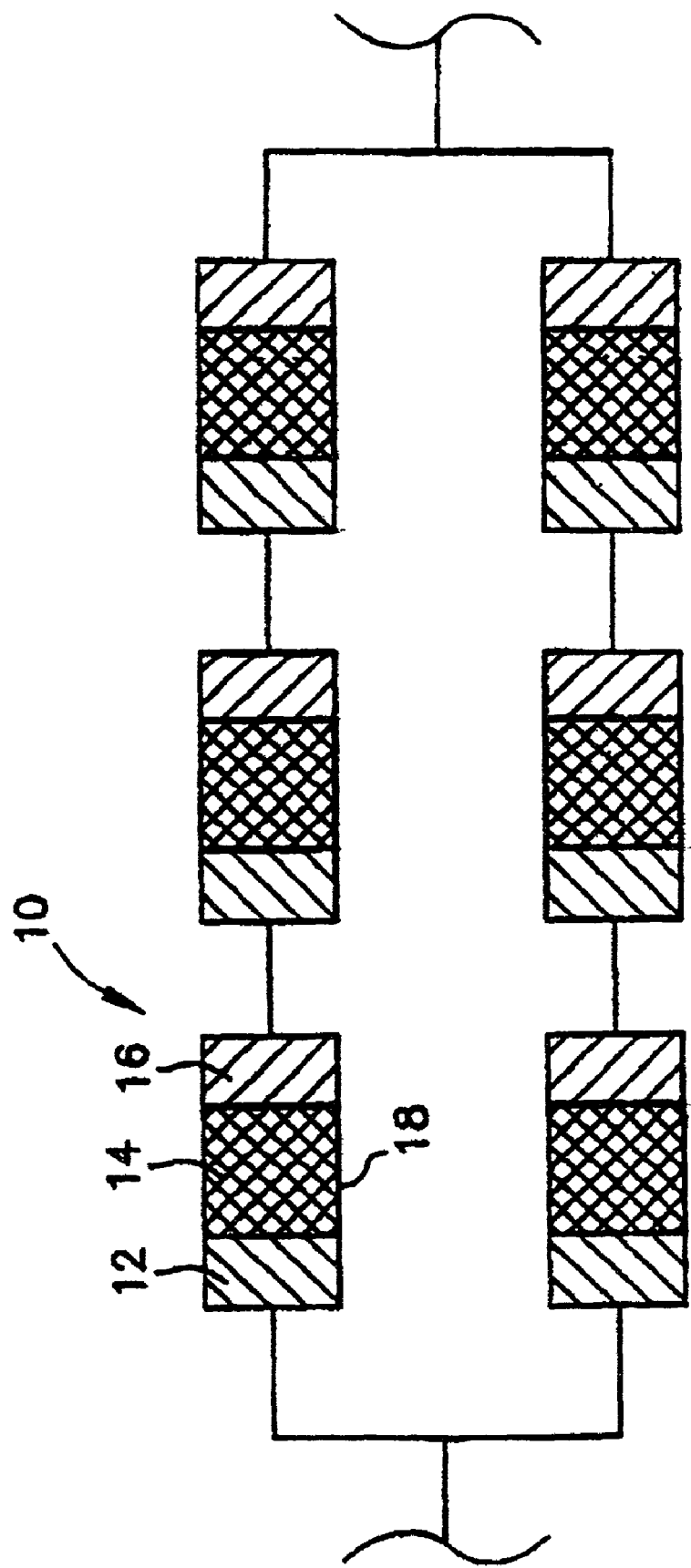

LITHIUM ION BATTERY WITH IMPROVED SAFETY

CONTRACTUAL ORIGIN OF THE INVENTION

The United States Government has rights in this invention pursuant to Contract No. W-31-109-ENG-38 between the U.S. Department of Energy (DOE) and The University of Chicago representing Argonne National Laboratory.

FIELD OF THE INVENTION

This invention pertains to non-aqueous rechargeable lithium batteries and to additives primarily for improving the safety thereof. It particularly pertains to the use of a blend of additives such us phosphate compound additives and organic carbonates, as well as single additives as a means for rendering lithium ion batteries safe from overcharge, over discharge or abuse testing.

BACKGROUND OF THE INVENTION

The demand for rechargeable batteries having ever-greater energy density has resulted in substantial research and development activity in rechargeable lithium batteries. The use of lithium in batteries is associated with high energy density, high voltage, long shelf life, but also with safety problems (i.e. fires, reactivity with oxygen and water), since lithium is a highly reactive element. As a result of these safety problems, most of large rechargeable lithium batteries are unsuitable for use by the public. In general, batteries with electrochemistries employing pure lithium metal, lithium carbon or lithium alloy anodes are only available to the public in very small sizes (e.g. coin cell size) or are primary types (e.g. non-rechargeable). However, larger rechargeable batteries can be used for military applications or certain remote power applications where safety concerns are of somewhat lesser importance, or the personnel involved are trained to deal with the higher level of hazard.

This invention pertains to lithium batteries or cells of the type set forth in which the anode or negative electrode includes or consists of a crystalline graphite or lithium metal or lithium alloy and an electrolyte of a salt such as lithium hexaflurophosphate dissolved in an organic solvent consisting of two or more aprotic constituents, one of which may be propylene carbonate as well as a positive electrode such as a lithium metal oxide. Propylene carbonate (PC) based solvents normally cause exfoliation of a graphite negative electrode resulting in the degradation of its electrochemical properties. Propylene carbonate, however, is an excellent solvent for use in lithium ion cells in that it permits cell operation to cross a broad temperature range with graphite based negative electrodes, which provide excellent power characteristics.

SUMMARY OF THE INVENTION

Non-aqueous rechargeable lithium batteries can be safe against thermal runaway by incorporating small amounts of suitable additive materials into the electrolyte. Flame retardant additives maybe selected from a blend of organic phosphates and carbonate compounds, such as triphenyl phosphate and aryl/alkylphosphate, and vinyl ethylene carbonate or from single additives can provide superior thermal safety behavior at the fully charged state in high voltage lithium ion batteries. Some of these compounds can also be used as degassing additives in lithium rechargeable batteries by preventing gas generation at extremely high temperature storage. Preferably, these additive compounds are soluble in the electrolyte.

Propylene carbonate based solvents can be utilized in lithium ion batteries provided that an additive is used in the electrolyte which forms a surface coating on the graphite particles of the negative electrode (anode) that prevents the propylene carbonate solvent from entering the crystal lattice of the graphite thereby preventing exfoliation of the graphite material with the resulting degradation of its electrochemical properties as a negative electrode. Anode passivating materials such as vinyl ethylene carbonate, vinyl quinone, vinylcrotonate and derivatives thereof, 9-fluorenone, vinyl acetate, vinylimidazole tribally triazine trione, 4,5-diethenyl-1,3-dioxolan-2-one, 4-ethenyl benzene-1,3-dioxolan-2-one, methyl silyl carbonate, 1,5-hexene-2,3-carbonate, 4-methyl-4-silyl-1,3-dioxolan-2-one, 4,5-diphenyl-1,3-dioxolan-2-one, 4,4-diphenyl-1,3-dioxolan-2-one, vinyl ethylene sulfite, 4-methoxymethyl-1,3-dioxolan-2-one, 4-hydroxymethyl-1,3-dioxolan-2-one, 4-(1-propenoxymethyl)-1,3-dioxolan-2-one, 4-(2-propenyl)-1,3-dioxolan-2-one, ethyl-2-furoate, 4-ethenol-1,3-dioxolan-2-one, 2-methoxyl-1,3-dioxolan, monofluoro ethylene may be used to passivate the anode or negative electrode and also prevent gassing, extend the calendar and cycle life of the battery and assist in improving the safety of the battery or cell. These later named additives also have the added property of preventing exfoliation of graphite containing anodes in the presence of propylene carbonate.

Accordingly, it is a primary objective of the invention to address the aforementioned need in the art by providing a lithium battery containing flame retardant material and/or anode passivating material in the non-aqueous electrolyte. The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a graphical representation showing the relationship between the discharged capacity of the battery and the number of battery cycles with 5 weight percent vinyl ethylene carbonate (curve A), 5 weight percent triphenylphosphate (curve B) and a mixture of vinyl ethylene carbonate, triphenylphosphate and monophenyl-dibutyl phosphate (curve C) as flame retardants;

FIGS. 2(a)–2(c) are self-heat rate curves from ARC experiments with various additives with FIG. 2(a) showing data for a 5 weight percent VEC in the electrolyte and FIG. 2(b) showing data for electrolyte with 5 weight percent TPP and FIG. 2(c) shows data for electrolyte with a mixture of 2 weight percent VEC, 2 weight percent TPP and 1 weight percent monophenyl dibutyl phosphate (MDP);

FIGS. 3(A) and 3(B) are graphical representations of data for an oven test illustrated in FIG. 3(A) and a nail penetration test illustrated in FIG. 3B for lithium cells containing flame retardant additives of 2 weight percent VEC, 2 weight percent TPP and 1 weight percent MDP;

FIG. 4 is a graphical illustration of the relationship of a charge/discharge curve for a half cell with a crystalline natural graphite anode a lithium metal cathode and a 1.2 molar $LiPF_6$ in 20%EC:70%PC:10%MEC electrolyte without an additive as an electrolyte (EC: Ethylene Carbonate, PC: Propylene Carbonate and MEC: Methyl-ethylene carbonate);

FIG. 5 is a charge-discharge curve for a half cell with a crystalline natural graphite anode and a lithium metal counter electrode with 1.2 molar $LiPF_6$ in the same electrolyte as in FIG. 4, the additive being 2 weight percent 4,5-diphenyl-1,3-dioxol-2-one;

FIG. 6 is a graphical representation of the area specific impedance, (ASI) change during a 50° C. storage of a half cell having a natural graphite anode, a lithium cathode and an electrolyte as indicated with a 1 to 5 weight percent 4,5-diphenyl-1,3-dioxol-2-one in the electrolyte against time;

FIG. 7 is a schematic representation of an electrochemical cell made in accordance with the invention; and FIG. 8 is a schematic representation of a battery comprised of a plurality of cells illustrated in FIG. 7.

DETAILED DESCRIPTION OF THE INVENTION

Coin type (2.5 mAh) and prismatic type (180 mAh) lithium ion cells were fabricated and tested to evaluate cycle life characteristics of lithium ion cells that contain fire-retardant and electrolyte additives.

The invention includes non-aqueous electrochemical lithium cells and batteries containing such electrodes when synthesized according to the invention. A representation of such a cell is shown schematically in FIG. 7, the cell represented by the numeral 10 having a negative electrode 12 separated from a positive electrode 16 by an electrolyte 14, all contained in an insulating housing 18 with suitable terminals (not shown) being provided in electronic contact with the negative electrode 12 and the positive electrode 16. Binders, solvents and other materials normally associated with both the electrolyte and the negative and positive electrodes are well known in the art and are not described herein, but are included as is understood by those of ordinary skill in this art. FIG. 8 shows a schematic illustration of one example of a battery in which two strings of electrochemical lithium cells 10; described above, are arranged in parallel, each string comprising three cells arranged in series.

The purpose of these tests was to determine whether the addition of flame-retardant material to the electrolyte could be used in lithium ion, i.e., rechargeable batteries without affecting the overall performance of the cell. The test was performed using a cell with carbon anode, lithium transition metal oxide cathode, and a non-aqueous electrolyte having a flame retardant additive or additives. Cells were cycled galvanostatistically at various current densities between cell voltage limits 4.2 V (charge) and 3.0 V (discharge).

FIG. 1 shows the discharge capacity of the battery with vinyl ethylene carbonate (VEC) additive (curve A), with triphenyl phosphate (TPP) (curve B), and with mixture of 2 wt % VEC, 2 wt % TPP and 1 wt % monophenyl-dibutyl phosphate (MDP) flame retardant (curve C) upon cycling. Apparently these flame-retardants do not have a significant negative affect on the cycling performance of the cell. As a matter of fact, the presence of only 2% TPP, 2% VEC and 1% MDP (curve C) in the electrolyte has improved the cycling efficiency of the cell. Thus, a blend at low concentrations of the phosphate additives and VEC appears to be the most promising in these tests.

Accelerating rate calorimetry (ARC) was used to investigate the effect of flame retardant on the onset temperature of the fully charged cell and its heat flow. The ARC is an adiabatic calorimeter in which heat evolved from the test sample is used to raise the sample temperature. ARC is conducted by placing a sample in a sample bomb inside an insulating jacket. In an ARC analysis, the sample is heated to a preselected initial temperature and held for a period of time to achieve thermal equilibrium. A search is then conducted to measure the rate of heat gain (self-heating) of the sample. If the rate of self-heating is less than a preset rate after the programmed time interval (typically 0.02° C. $min^{-1}$), the sample temperature is stepped to a higher value, and the heat-wait-search sequence is repeated. After a self-heating rate greater than the present value is measured, the heat-wait-search sequence is abandoned; the only heating supplied to the calorimeter thereafter is that required to maintain the adiabatic condition between the sample and the jacket. Heat generated from the reaction inside the sample increases its temperature and pressure, thereby increasing the rate of the reaction. This technique provides information for thermal hazard evaluation, material-handling procedures, and can provide additional information on the energies of activation, storageability, and other fundamental thermokinetic parameters that are not available using other techniques. 150 mg of anode electrode and 350 mg of electrolyte composition were introduced in 23 @×3@ dia. titanium bomb as a sample for ARC test.

FIGS. 2(a)–(c) compares the heat flow from a reaction between fully charged graphite anode, and electrolyte $LiPF_6$/EC/DEC with vinyl ethylene carbonate (FIG. 2A), with triphenyl phosphate (FIG. 2B), and with mixture of 2 wt. % VEC, 2 wt % TPP and 1 wt % MDP (FIG. 2C) flame retardant. The electrolyte containing flame retardant appears to have significantly better thermal behavior though the concentration of the flame retardant used in the electrolyte is less than 5 wt %. The addition of 2 wt % VEC, 2 wt % TPP and 1 wt % MDP mixed additive (FIG. 2C) significantly improves the safety performance of the cell. In this case, the onset temperature of reaction increases from 130° C. in the cell without additive to 210° C. in the cell with a mixed additive of 2-wt % VEC, 2 wt % TPP and 1 wt % MDP. In addition, the heat flow is an order of magnitude lower in the cell with a mixed additive 2 wt % VEC, 2 wt % TPP and 1 wt % MDP than in the cell without additive. Furthermore, adding only 5% VEC or 5% TPP slightly improves the safety performance of the cell by increasing the onset temperature to 160° C. and 190° C. in VEC and TPP, respectively. However, the amount of heat flow although reduced is still significantly higher than in the case of adding a mix of 2 wt % VEC, 2 wt % TPP and 1 wt % MDP Overcharge studies of the 180 mAh Li-ion cell indicate that when a mixture of 2 wt % vinyl ethylene carbonate, 2 wt % triphenyl phosphate, and 1 wt % monophenyl-dibutyl phosphate (MDP) are added to the electrolytes, the normal pressure build up in the cell caused by gassing is reduced by a factor of ten, going from 20% to <2% in Table 1:

TABLE 1

Cell body thickness change after oven test

| Added Flame Retardant Composition | Cell Volume Change After Over Charge Test (%) |
|---|---|
| 5% VEC | 19 |
| 5% TPP | 16.8 |
| 2% MDP + 2% VEC + 1% TPP | 2.9 |

As shown in FIGS. 3(A) and 3(B), safety studies of the prismatic Li-ion cell indicate that when a mixture of 2 wt % vinyl ethylene carbonate, 2 wt % triphenyl phosphates, and 1 wt % monophenyl-dibutyl phosphate are added to the electrolytes, there was no thermal runaway at high temperature storage of 150° C. after oven test, and even nail penetration test. The oven test was carried out in a cell that was initial over discharged to 4.5V and then stored at 150° C. for two hours in an oven. The cell temperature was monitored during the storage time. The nail penetration test was carried on a cell that was overcharged to 4.5V. The additive mixture was thus found to significantly enhance the Li-ion battery safety, reduce gassing in the cell and had no negative effects on the normal capacity or cycle life.

The invention also includes various additives which added to the electrolyte passivate the anode, suppress gassing during cycling, extends calendar life and improves the safety of the lithium batteries. Particularly, but not exclusively, in a situation where the electrolyte consists of a salt such as lithium hexaflurophosphate dissolved in organic solvent consisting of two or more aprotic constituents, one of which is propylene carbonate, the various additives hereinafter set forth prevent the graphite anodes, when present, from exfoliating in the presence of propylene carbonate. Propylene carbonate is a desirable electrolyte solvent because it provides a solvent with a high dielectric constant permitting the dissolution of the fluoride salt to form a highly conductive electrolyte across a broad temperature range. Passivating material used with graphite containing anodes prevents the propylene carbonate solvent from entering the crystal lattice of the graphite, which ruins its electrochemical properties as a negative electrode. Being able to use the propylene carbonate based solvents in lithium ion cells has a huge advantage in that it permits cell operation across a broad temperature range with a graphite based negative electrode that possesses excellent power characteristics. Propylene carbonate is of low cost and provides a very stable electrolyte, which prolongs the calendar life and improves the safety of the lithium ion system.

Additives which are capable of passivating anodes and where the anode includes graphite preventing exfoliation of the graphite in the presence of propylene carbonate include vinyl ethylene carbonate, vinyl quinone, vinylcrotonate, 9-fluorenone, vinyl acetate, tribally triazine trione, 4,5-diethenyl-1.3-dioxolan-2-one, 4-ethenyl benzene-1,3-dioxolan-2-one, methyl silyl carbonate, 1,5-hexene-2,3-carbonate, 4-methyl-4-silyl-1,3-dioxolan-2-one, 4,5-diphenyl-1,3-dioxolan-2-one, 4,4-diphenyl-1,3-dioxolan-2-one, vinyl ethylene sulfite, 4-methoxymethyl-1,3-dioxolan-2-one, 4-hydroxymethyl-1,3-dioxolan-2-one, 4-(1-propenoxymethyl)-1,3-dioxolan-2-one, 4-(2-propenyl)-1,3-dioxolan-2-one, ethyl-2-furoate, 4-ethenyl-1,3-dioxolan-2-one, 2-methoxyl-1,3-dioxolan, divinylphenyl carbonate, dicarbonate quinione, ec hydrazine, bis-N,N-dimethylcarbamate, 4,4-dimethyl-5-methylene-1,3-dioxolan-2-one, benzene tetracarboxyldianhydride, 4-methoxyphenyl-1,3-dioxolan-2-one, 4-trifluorobenzyl-1,3-dioxolan-2-one.

Referring now to FIG. 4, the cycling curve of a half-cell consisting of crystalline natural graphite (NG) electrode in a 70% propylene carbonate-based electrolyte [LiPF$_6$/EC:PC (30:70)]. Obviously, the cell cannot be cycled due to the exfoliation of graphite in the first lithiation process. Nearly no lithium could be inserted and extracted from this NG electrode. With the addition of small amount of an appropriate additive, exfoliation may be prevented; permitting cheap highly ordered natural graphite to be used as the negative electrode. FIG. 5 shows an example of using 2-wt % 4,5-diphenyl-1,3-dioxol-2-one as the additive. The cell has good cycle ability. Furthermore, the new surface layer formed by the decomposition of the additive and reaction with other components of the electrolyte may provide better protection of the graphite compared to the conventional solid electrolyte interface (SEI) layer formed in the presence of an additives. As a result, the cell could exhibit a long calendar life and a better safety performance. FIG. 6 shows the variation of the area specific impedance of the cell with time after accelerated aging at 50° C. The cell comprising natural graphite active material, lithium counters electrode and electrolyte with 4,5-diphenyl-1,3-dioxol-2-one additive. The cell was stored at 90% state-of-charge (SOC) for 3 weeks at 50° C. and the area specific impedance was measured once two days. The area specific impedance of the cell, which could limit the calendar life of lithium batteries especially for high power, remains quite stable due to a low surface reactivity between carbon and electrolyte. In addition, the new stable surface layer caused by the additive at the graphite surface will significantly enhance the safety performance of such lithium secondary batteries as well.

In general, the additives may be present in the electrolyte in the range from about 0.5% to about 20% by weight. Moreover, the electrolyte may contain a variety of salts, such as lithium hexafluorophosphate, lithium tetrafluoroborate, lithium hexafluoroarsenate lithium perchlorate or amide salt, anode of graphite, lithium metal, or lithium alloy and the cathodes may be a variety of materials, such as lithiated metal oxides or phosphates of manganese, nickel, cobalt and iron, or a combination thereof. Although solvents of ethylene carbonate, propylene carbonate, diethyl carbonate and ethyl methyl carbonate have been disclosed, other solvents are applicable as is known to one of ordinary skill in the art.

While particular embodiments of the present invention have been shown and described, it will be appreciated by those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

The embodiments of the invention in which an exclusive property or privilege is claimed are defined as follows:

1. A non-aqueous rechargeable lithium battery having a lithium insertion compound positive electrode, a negative electrode of one or more of lithium, lithium compound, and carbon, a solvent for a non-aqueous electrolyte containing a lithium salt and a blend of flame retardants and anode passivation additives, and gassing suppression additives, said flame retardant additive selected from one or more of aryl/alkyl phosphate, such as a triphenyl phosphate, $(C_6H_5)_3PO_4$, a diphenyl monobutylphosphate, $(DMP)C_4H_9(C_6H_5)_2PO_4$, and a phenyl alkyl phosphate, $(C_6H5)R_2PO_4$, a cyclic ethyl carbonate, $C_2H_4CO_3$, and derivatives thereof, where the 1 to 4 hydrogen groups are replaced with a C1–C6 alkane, a fluoridated C1–C6 alkane, an unsaturated alkane carbonate and a mixtures thereof, and said anode passivation additives being one or more of the following: vinyl ethylene carbonate, vinyl quinone, vinylcrotonate, 9-fluorenone, vinyl acetate, tribally triazine trione, 4,5-diethenyl-1,3-dioxolan-2-one, 4-ethenyl benzene-1,3-dioxolan-2-one, methyl silyl carbonate, 1,5-hexene-2,3-carbonate, 4-methyl-4-silyl-1,3-dioxolan-2-one, 4,5-diphenyl-1,3-dioxolan-2-one, 4,4-diphenyl-1,3-dioxolan-2-one, vinyl ethylene sulfite, 4-methoxymethyl-1,3-dioxolan-2-one, 4-hydroxymethyl-1,3-dioxolan-2-one, 4-(1-propenoxymethyl)-1,3-dioxolan-2-one, 4-(2-propenyl)-1,3dioxolan-2-one, ethyl-2-furoate, 4-ethenol-1,3-dioxolan-2-one, 2-methoxyl-1,3-dioxolan, divinylphenyl carbonate, dicarbonate quinione, ec hydrazine, bis-N,N-dimethylcarbamate, 4,4-dimethyl-5-methylene-1,3-dioxolan-2-one, benzene tetracarboxyldianhydride, 4-methoxyphenyl-1,3-dioxolan-2-one, 4-trifluorobenzyl-1,3-dioxolan-2-one.

2. A non-aqueous rechargeable lithium battery as in claim 1, wherein an additive is one of the following or combination thereof: vinylcrotonate, 9-fluorenone, vinyl acetate, tribally triazine trione, 4,5-diethenyl-1.3-dioxolan-2-one, 4-ethenyl benzene-1,3-dioxolan-2-one, methyl silyl carbonate, 1,5-hexene-2,3-carbonate, 4-methyl-4-silyl-1,3-dioxolan-2-one, 4,5-diphenyl-1,3-dioxolan-2-one, 4,4-diphenyl-1,3-dioxolan-2-one, vinyl ethylene sulfite, 4-methoxymethyl-1,3-dioxolan-2-one, 4-hydroxymethyl-1,3-dioxolan-2-one, 4-(1-propenoxymethyl)-1,3-dioxolan-2-one, 4-(2-propenyl)-1,3-dioxolan-2-one, ethyl-2-furoate, 4-ethenol-1,3-dioxolan-2-one, 2-methoxyl-1,3-dioxolan, divinylphenyl carbonate, dicarbonate quinione, ec hydrazine, bis-N,N-dimethylcarbamate, 4,4-dimethyl-5-methylene-1,3-dioxolan-2-one, benzene tetracarboxyldianhydride, 4-methoxyphenyl-1,3-dioxolan-2-one, 4-trifluorobenzyl-1,3-dioxolan-2-one.

3. A non-aqueous rechargeable lithium battery as in claim 1, wherein an additive is a mixture of monobutyl-diphenyl phosphate, dibutyl-monophenyl phosphate and vinyl ethylene carbonate.

4. A non-aqueous rechargeable lithium battery as in claim 1, wherein an additive is a mixture of monopropyl-diphenyl phosphate, dipropyl-monophenyl phosphate and vinyl ethylene carbonate.

5. A non-aqueous rechargeable lithium battery as in claim 1, wherein an additive is a mixture of triphenyl phosphate, vinyl ethylene carbonate and dibutyl-monophenyl phosphate.

6. A non-aqueous rechargeable lithium battery as in claim 1, wherein the additive is a mixture of monobutyl-diphenyl phosphate and diamyl-monophenyl phosphate and vinyl ethylene carbonate.

7. A non-aqueous rechargeable lithium battery as in claim 1, wherein an additive is monobutyl-diphenyl phosphate and vinyl ethylene carbonate.

8. A non-aqueous rechargeable lithium battery as in claim 1, wherein an additive is dibutyl-monophenyl phosphate and vinyl ethylene carbonate.

9. A non-aqueous rechargeable lithium battery as in claim 1, wherein an additive is tripropyl phosphate, triphenyl phosphate, and ethyl-2-furoate.

10. A non-aqueous rechargeable lithium battery as in claim 1, wherein an additive is monoamyl-diphenyl phosphate and methyl silyl carbonate.

11. A non-aqueous rechargeable lithium battery as in claim 1, wherein the additive is a mixture of triphenyl phosphate and vinyl ethylene carbonate, present up to about 3-wt % of the electrolyte.

12. A non-aqueous rechargeable lithium battery as in claim 1, wherein an additive is a mixture of monofluoroethylene carbonate and triphenyl phosphate, each present up to about 3 wt % of the electrolyte.

13. A non-aqueous rechargeable lithium battery as in claim 1, wherein an additive is vinyl ethylene carbonate and tributyl phosphate and a fluoridated hexane.

14. A non-aqueous rechargeable lithium battery as in claim 1, wherein an additive is monoamyl-diphenyl phosphate, and vinyl ethylene sulfite.

15. A non-aqueous rechargeable lithium battery as in claim 1, wherein an additive is a mixture of triphenyl phosphate, monoamyl-diphenyl phosphate and vinyl ethylene carbonate.

16. A non-aqueous rechargeable lithium battery as in claim 1, wherein the additive is monophenyl ethylene carbonate and monophenyl dibutyl phosphate.

17. A non-aqueous rechargeable lithium battery as in claim 1, wherein an additive is a mixture of monophenyl carbonate and triphenyl phosphate.

18. A non-aqueous rechargeable lithium battery as in claim 1, wherein an additive is a mixture of 1,2-difluoroethylene carbonate and triphenyl phosphate.

19. A non-aqueous rechargeable lithium battery as in claim 1, wherein an additive is a mixture of 1,2-diflxuoroethylene carbonate, triphenyl phosphate and monobutyl-diphenyl phosphate.

20. A non-aqueous rechargeable lithium battery as in claim 1, wherein an additive is monofluorovinyl ethylene carbonate, and tripropyl phosphate.

21. A non-aqueous rechargeable lithium battery as in claim 1, wherein an additive is a mixture of monofluorovinyl ethylene carbonate and triphenyl phosphate.

22. A non-aqueous rechargeable lithium battery as in claim 1, wherein the total concentration of additive is between 0.01 wt % and 20 wt % by weight of the electrolyte.

23. A non-aqueous rechargeable lithium battery as in claim 1, in which an additive is vinyl ethylene carbonate and tributyl phosphate.

24. A non-aqueous rechargeable lithium battery as in claim 1, in which an additive is vinyl quinone.

25. A non-aqueous rechargeable lithium battery as in claim 1, in which an additive is a mixture of vinyl crontonate or derivative thereof and triphenyl phosphate.

26. A non-aqueous rechargeable lithium battery as in claim 1, in which an additive is a mixture of 9-fluorenone, and tripropyl phosphate.

27. A non-aqueous rechargeable lithium battery as in claim 1, in which an additive is vinylimidazole.

28. A non-aqueous rechargeable lithium battery as in claim 1, in which an additive is N-vinyl-2 pyrrolidinone and triphenyl phosphate.

29. A non-aqueous rechargeable lithium battery as in claim 2, in which additives are added in a proportion of 0.001% to 20% by weight of said electrolyte.

30. A non-aqueous rechargeable lithium battery as in claim 1, in which the solvent includes propylene carbonate and one or more solvents selected from ethylene carbonate, dimethyl carbonate, ethyl methyl carbonate or similar organic carbonate solvents.

31. A non-aqueous rechargeable lithium battery as in claim 1, in which said lithium salt is selected from lithium hexafluorophosphate, lithium tetrafluoroborate, lithium hexafluoroarsenate lithium perchlorate or amide salt.

32. A non-aqueous rechargeable lithium battery as in claim 1, in which said positive electrode is selected from an oxide or phosphate of lithium metal or manganese, nickel, cobalt and iron, or a combination thereof.

* * * * *

UNITED STATES PATENT AND TRADEMARK OFFICE
CERTIFICATE OF CORRECTION

PATENT NO. : 7,026,074 B2 Page 1 of 1
APPLICATION NO. : 10/077569
DATED : April 11, 2006
INVENTOR(S) : Chun-hua Chen et al.

It is certified that error appears in the above-identified patent and that said Letters Patent is hereby corrected as shown below:

Claim 19, column 8, line 35, change "diflxuoro" to --difluoro--;

Claim 25, column 8, line 56, delete the word "derivative" and insert --derivatives--.

Signed and Sealed this

Fourteenth Day of November, 2006

JON W. DUDAS
*Director of the United States Patent and Trademark Office*